(12) United States Patent
King et al.

(10) Patent No.: US 11,090,966 B2
(45) Date of Patent: Aug. 17, 2021

(54) METHOD FOR MANUFACTURING PSEUDO-RANDOM STEGANOGRAPHIC CAMOUFLAGE

(71) Applicant: Jeagr Ventures LLC, Ceres, CA (US)

(72) Inventors: Jarod Lee King, Ceres, CA (US); Richard Brewster Main, Newark, CA (US)

(73) Assignee: Jeagr Ventures LLC, Ceres, CA (US)

( * ) Notice: Subject to any disclaimer, the term of this patent is extended or adjusted under 35 U.S.C. 154(b) by 0 days.

(21) Appl. No.: 16/536,281

(22) Filed: Aug. 8, 2019

(65) Prior Publication Data

US 2020/0103204 A1     Apr. 2, 2020

Related U.S. Application Data

(60) Division of application No. 16/358,645, filed on Mar. 19, 2019, now abandoned, which is a continuation-in-part of application No. 29/553,844, filed on Feb. 4, 2016, now abandoned, and a continuation-in-part of application No. 15/016,231, filed on Feb. 4, 2016, now abandoned.

(51) Int. Cl.
| | |
|---|---|
| *H04N 1/44* | (2006.01) |
| *H04N 1/32* | (2006.01) |
| *B41M 3/14* | (2006.01) |
| *F41H 3/02* | (2006.01) |
| *H04N 1/14* | (2006.01) |

(52) U.S. Cl.
CPC .............. *B41M 3/14* (2013.01); *F41H 3/02* (2013.01); *H04N 1/14* (2013.01); *H04N 1/32309* (2013.01); *H04N 1/448* (2013.01); *H04N 1/32272* (2013.01)

(58) Field of Classification Search
CPC .......... G06F 3/1243; G06F 2221/0733; G06F 2221/074; G06F 21/16; H04N 1/14; H04N 1/32272; H04N 1/32309; H04N 1/448; H04N 1/32144; B41M 3/14; F41H 3/00; F41H 3/02
USPC ..................................... 358/3.28, 1.11–1.18
See application file for complete search history.

(56) References Cited

U.S. PATENT DOCUMENTS

| | | |
|---|---|---|
| 1,650,372 A | 11/1927 | Maurer et al. |
| 2,028,948 A | 1/1936 | Pohlmann |
| 3,967,026 A | 6/1976 | Dalblom |

(Continued)

*Primary Examiner* — Chad Dickerson
(74) *Attorney, Agent, or Firm* — Lance M. Pritikin

(57) ABSTRACT

A concealment substrate manufacturing process begins by printing or painting a graphic design as camouflage on substrates like mesh-textured uniforms, military equipment, Mylar thermal blanket sheets, adhesive tapes, etc. The graphic design is uniquely generated from pseudo-random noise in four overlaying color pigments that each begin as a raster of randomly generated noise in a standardized tile size. E.g., gray, green, tan, and brown colors natural for concealment applications are each masked by two-tone image contrast rasters. The four results are mixed together in groups with a monochrome mixing mask to produce a whole tile. Such concealment camouflage tile conjoins seamlessly on-edge within other arrays of identical tiles. One variation adds a distorted-grid mesh-texture overly texture to the concealment camouflage, and even a faint "watermark" related to a commercial trademark.

10 Claims, 19 Drawing Sheets

(56) References Cited

U.S. PATENT DOCUMENTS

| | | |
|---|---|---|
| D297,596 S | 9/1988 | Marquart, Sr. |
| D301,803 S | 6/1989 | McIlhinney |
| D301,804 S | 6/1989 | McIlhinney |
| D301,805 S | 6/1989 | McIlhinney |
| 5,066,529 A | 11/1991 | Huber et al. |
| 5,271,999 A | 12/1993 | Short |
| 5,281,460 A | 1/1994 | Cox |
| 5,850,481 A * | 12/1998 | Rhoads ............ G11B 20/00181 382/232 |
| D419,778 S | 2/2000 | Alfonso et al. |
| 6,061,828 A * | 5/2000 | Josephs ................. A41D 29/00 2/69 |
| D428,263 S | 7/2000 | Forrest |
| D474,897 S | 5/2003 | Clausen et al. |
| D487,848 S | 3/2004 | Crye et al. |
| D491,372 S | 6/2004 | Dugas et al. |
| D560,915 S | 2/2008 | Crye et al. |
| D572,909 S | 7/2008 | Crye et al. |
| D592,861 S | 5/2009 | Crye et al. |
| D615,762 S | 5/2010 | Kimmel |
| D640,062 S | 6/2011 | Shevtsova et al. |
| D656,743 S | 4/2012 | Culler et al. |
| D657,961 S | 4/2012 | Brookman |
| D659,406 S | 5/2012 | Crye |
| 9,062,938 B1 | 6/2015 | McIntosh et al. |
| 9,074,849 B1 | 7/2015 | McIntosh et al. |
| 9,150,293 B1 | 10/2015 | Swerdlin |
| D808,664 S | 1/2018 | Bauer |
| D830,705 S | 10/2018 | Rosswog |
| 2004/0048026 A1 | 3/2004 | Kan |
| 2006/0222827 A1 | 10/2006 | Marshall et al. |
| 2010/0251455 A1 | 10/2010 | Lampe |
| 2012/0163583 A1* | 6/2012 | Nakagata ............. H04L 9/3226 380/28 |
| 2012/0213402 A1* | 8/2012 | Moreno de Ayala ........................ H04N 1/32154 382/100 |
| 2014/0103123 A1* | 4/2014 | McKinney, Jr. ............................ G06K 19/06037 235/494 |
| 2016/0153750 A1* | 6/2016 | King ........................ F41H 3/02 428/39 |

* cited by examiner

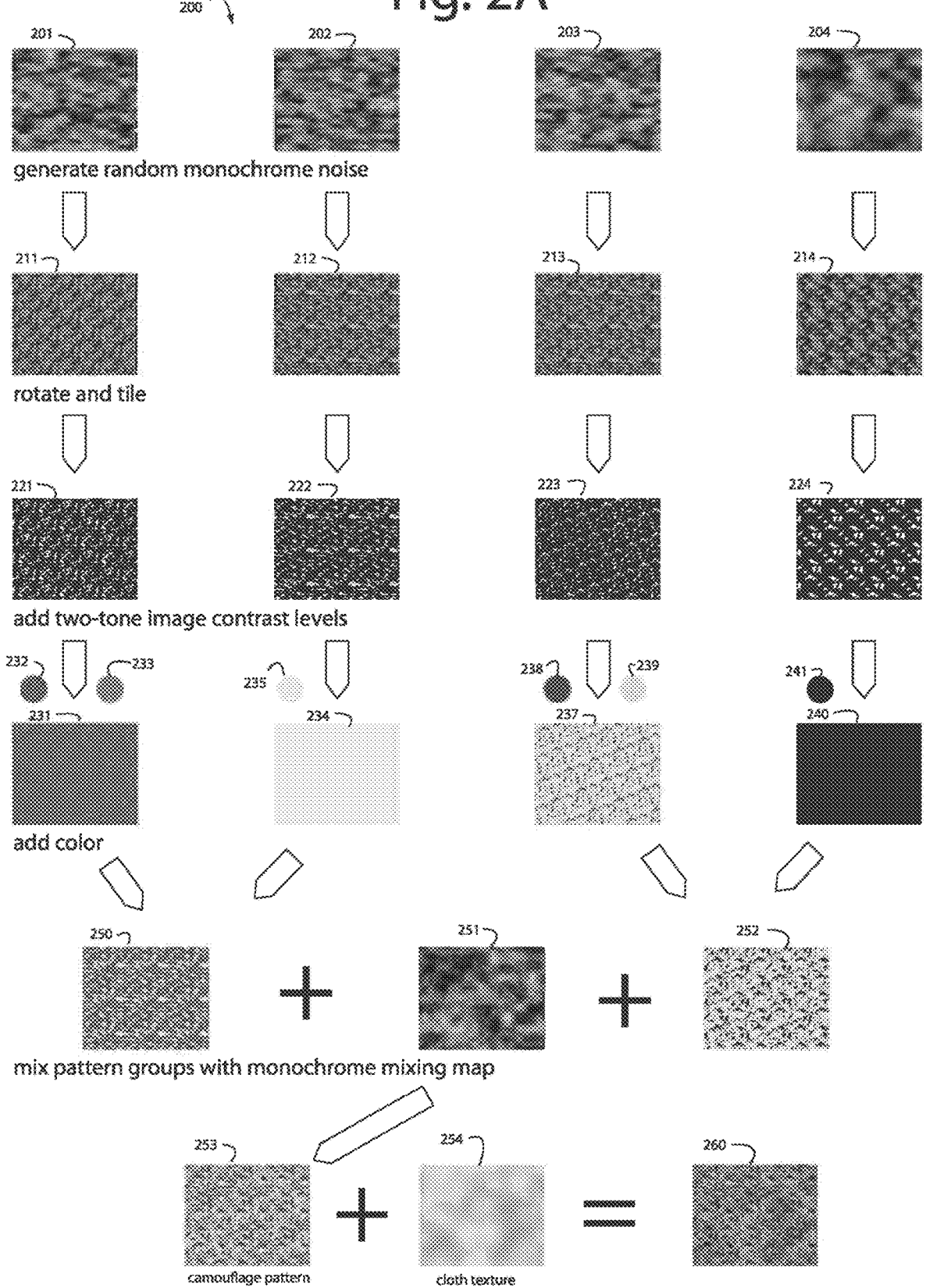

203

213

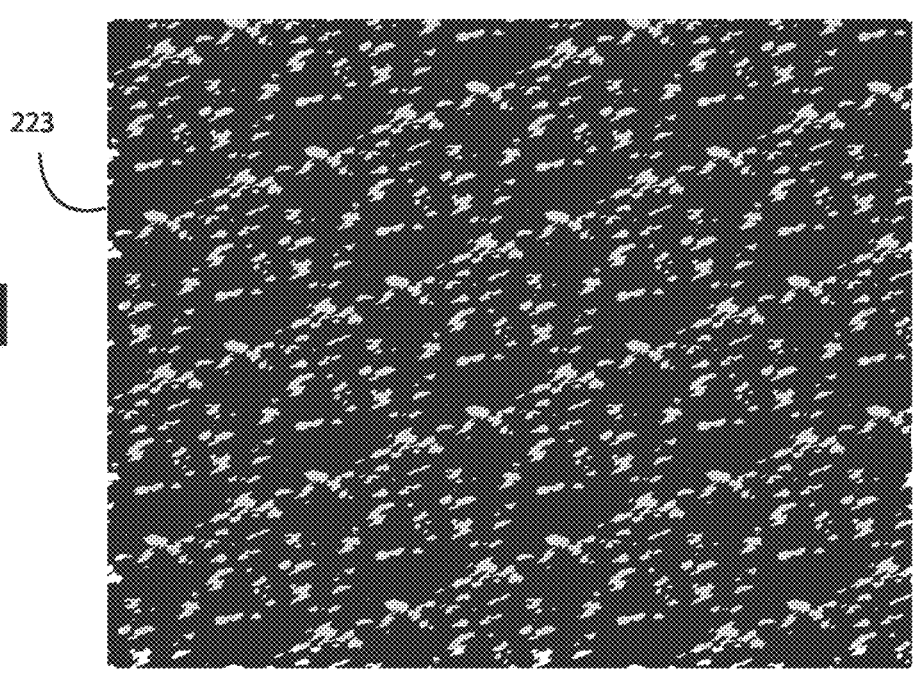
Fig. 2H
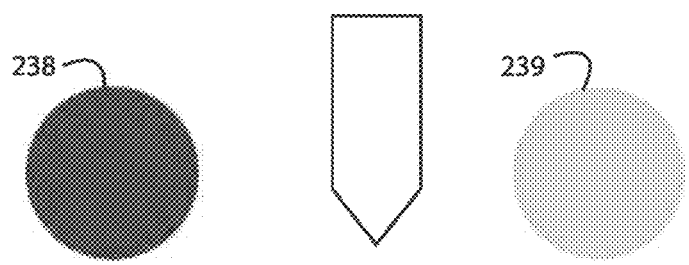
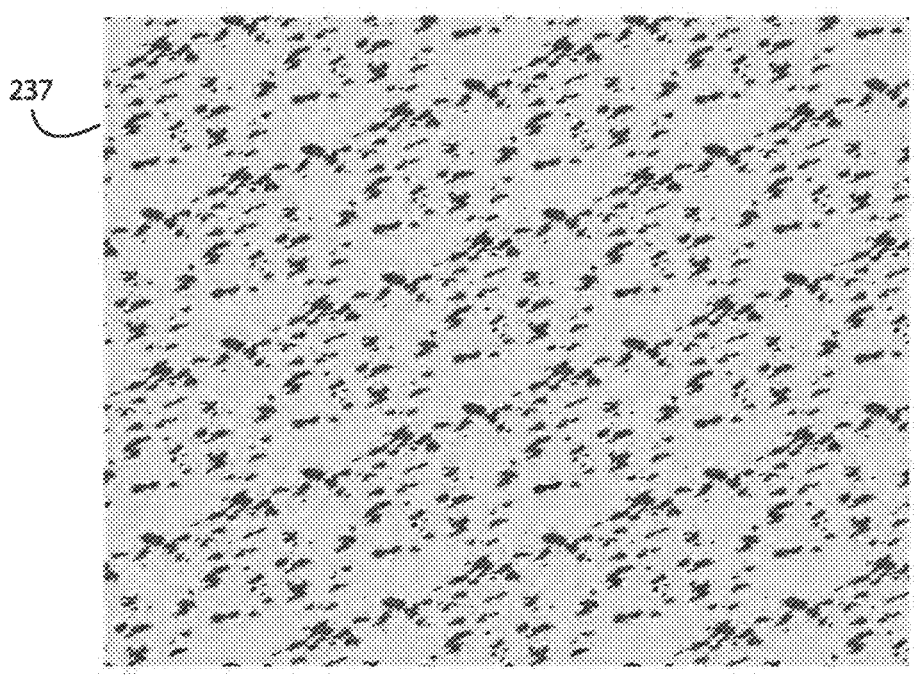

224

241

240

METHOD FOR MANUFACTURING PSEUDO-RANDOM STEGANOGRAPHIC CAMOUFLAGE

FIELD OF THE INVENTION

The present invention relates to manufacturing concealment-type survivalist gear, and more particularly to producing a tiled and mesh-textured camouflage-pattern graphic design with encoded steganographic messages applied to a substrate like plastic film, adhesive tape, clothing, tent, blanket, vehicle, etc.

DESCRIPTION OF THE PRIOR ART

Camouflage can use any combination of materials, coloration, or illumination for concealment, either by making people or equipment hard to discern by sight, or by masquerading as something else more expected. Examples include jungle cover, desert sands, blue sky, grasses and tree litter, soils, leaves, and snow. Gilly suits actually cover a sniper with an overall decorated with fake mosses, twigs, grasses, dirt, leaves, etc. Natural clutter on an optical level to natural vision or cameras will resolve as stills or video rasters of noise. In videos, waves through the noise can appear to be wind in the grasses or trees, waves in the water, and clouds in the skies.

One object of camouflage is to be able to hide personnel and equipment behind cover from easy visual detection in the field by adversaries or prey. The basic method used is to match the colors and patterns on the camouflage to the immediate surrounds so that at a distance there are no sharp, recognizable silhouettes or outlines. Camouflage effective in contrast to one background or environment may stand out and yell loudly in another. The chameleon has been able to overcome this limitation, but manmade camouflage is not near as adaptable or as good at adapting and blending in.

Warships and combat aircraft are routinely painted with desert, woodland, artic, blue sky, open sea, and other colors and patterns to help conceal such equipment out in the open. Some warships and combat aircraft will, of course, be "friendlies" and some will be foes. Conventional camouflage conceals both the same. And so a misidentification caused by the concealment can be costly or deadly.

In 2005 the US Army adopted the Universal Camouflage Pattern as the standard camouflage pattern for all environments. When soldiers started to complain about it completely underperforming in every environment the Army issued a Solicitation for a better pattern.

"The US Army Contracting Center, Aberdeen Proving Ground (Soldier, Chemical, Research & Test), Natick Contracting Division (NCD) on behalf of the US Army Soldier System Center, Natick, MA(Product Manager Soldier Clothing and Individual Equipment), intends to issue a solicitation under Authority of FAR Part 15, for a research and development effort to work with multiple vendors to develop a family of camouflage patterns. The family is comprised of three patterns/color palettes for the uniforms (i.e., wooded, arid and transitional), which have the same or similar geometry, and one pattern for the personal protective equipment (PPE)/organizational clothing and individual equipment (OCIE), which may or may not be one of the uniform patterns. The uniform patterns/palettes must be compatible with the PPE/OCIE pattern/palette. The first objective of this effort is to develop for the US Army a family of camouflage patterns that offers improved concealment and reduced detection capability over current patterns. The second objective is to acquire the data rights for a portion or all of the best performing camouflage pattern families. The Government anticipates that this requirement will be competed full and open; however, the Government reserves the right to change the solicitation procedure. Firms shall not be reimbursed for any costs associated with proposals. The Government envisions multiple awards, to a Business under North American Industry Classification System code 541712, and Federal Supply Code 8731. When released, the solicitation, including all amendments and applicable documents, will be available in electronic substrate, on or about March 18th, 2011, at the US Army Contracting Center, Aberdeen Proving Ground (SCRT), Natick Contracting Division website, https://www3.natick.army.mil On May 23, 2014, the US Army announced that the Scorpion pattern, a predecessor to Crye Precision's MultiCam, was selected to replace UCP as the Army's standard camouflage pattern, despite the fact that it was dropped from the trials for being too similar to MultiCam.

Crye Precision's MultiCam pattern also forms a basis for the British MTP pattern then replacing the DPM and the new (2013) AMP (Australian Multicam Pattern) which will replace the DPCU. Polish special forces are using a version of the Multicam called Suez. MultiCam is a single camouflage pattern that helps a wearer hide in varied environments, seasons, elevations, and light conditions. It tries to address a real-world need for concealment in different environments, with one basic kit of gear. While there are many location-specific patterns, MultiCam work across a very broad range of environmental conditions when observed in both the visual and near infrared (night vision) spectrums. The pattern reflects some of the surrounding colors of the environment. It takes on an overall green appearance when under a green forest canopy, and an overall tan look when in the open desert. By adapting to varying local lighting conditions, it blends with many environments, elevations, seasons, weather conditions, and times of the day. The design is based on the way the human eye and brain perceive shapes, volumes, and colors. Only a very small portion of the human eye can perceive color, so the brain does a lot of interpolating. MultiCam uses this principle to help observers "see" the pattern as part of the background. MultiCam relies on a blending effect, rather than a contrast effect to mask the wearer. This effect allows it to perform in a wide range of environments, and keeps the pattern effective even at close distances where pixelated or "blocky" patterns will often stand out against natural, non-blocky environments.

What would be very useful in the field of camouflage would be camouflage that visually flashed a marker identifying the "friendly" and yet maintained the concealment to foes or unauthorized spotters. Not directly of course, but with "authorized" digital imaging cameras. For example, the Marker could be something that resolved after decryption to "USA", "Company-B", "Press", "FIELD HOSPITAL", "Battery-C", "Deer Hunters", "Tunnel Entrance", etc.

SUMMARY OF THE INVENTION

Briefly, a concealment substrate manufacturing embodiment of the present invention comprises printing or painting a graphic design as camouflage on substrates such as mesh-textured uniforms, military equipment, Mylar thermal blanket sheets, adhesive tapes, etc. The graphic design is uniquely generated from pseudo-random noise in four overlaying color pigments that each begin as a raster of randomly generated noise in a standardized tile size. E.g., gray, green, tan, and brown colors natural for concealment applications are each masked by two-tone image contrast rasters. The four results are mixed in groups together with a monochrome mixing mask to produce a whole tile of concealment camouflage that will conjoin seamlessly on-edge within other arrays of such tiles. A further refinement visually adds a distorted-grid mesh-texture overly texture to the concealment camouflage, and even faint "watermarks" of commercial trademarks.

These and other objects and advantages of the present invention no doubt become obvious to those of ordinary skill in the art after having read the following detailed description of the preferred embodiments which are illustrated in the various drawing figures.

IN THE DRAWINGS

FIG. 1 is a functional block diagram of a pseudo-random camouflage system in an embodiment of the present invention. The pseudo-random camouflage system has a factory to produce a sheet of pseudo-random camouflage comprising a pseudo-randomly generated and positioned collection of blobs, splotches, drops, spots, globules, and blotches. A second field-deployed part can then optically resolve and read encrypted messages in a pseudo-random camouflage captured image obtained in any orientation and practically at any distance;

Figure 2B:
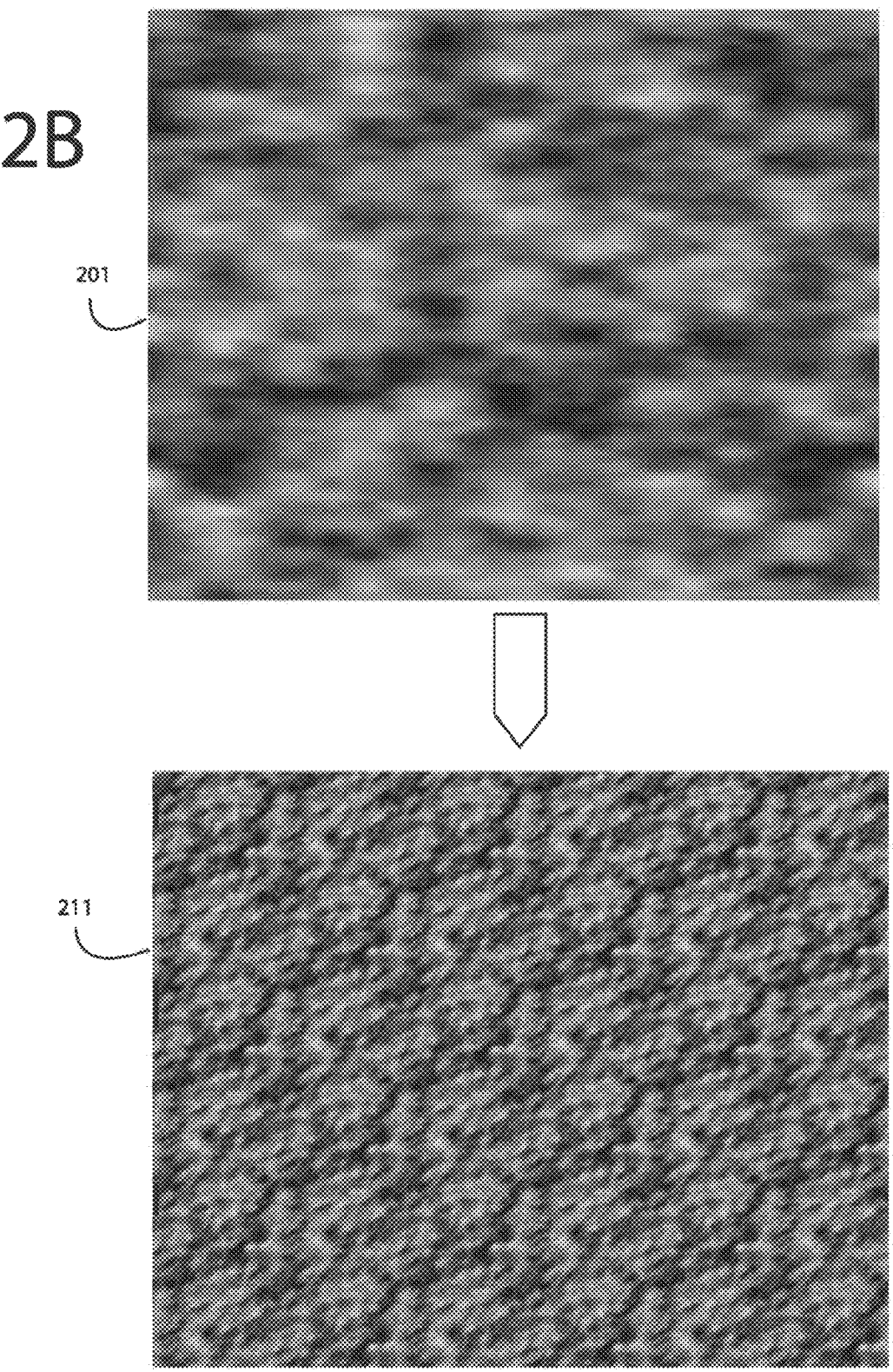
FIGS. 2B-2H and 2J-2M are detailed views of the various patterns included in FIG. 2A.
Figure 2C:
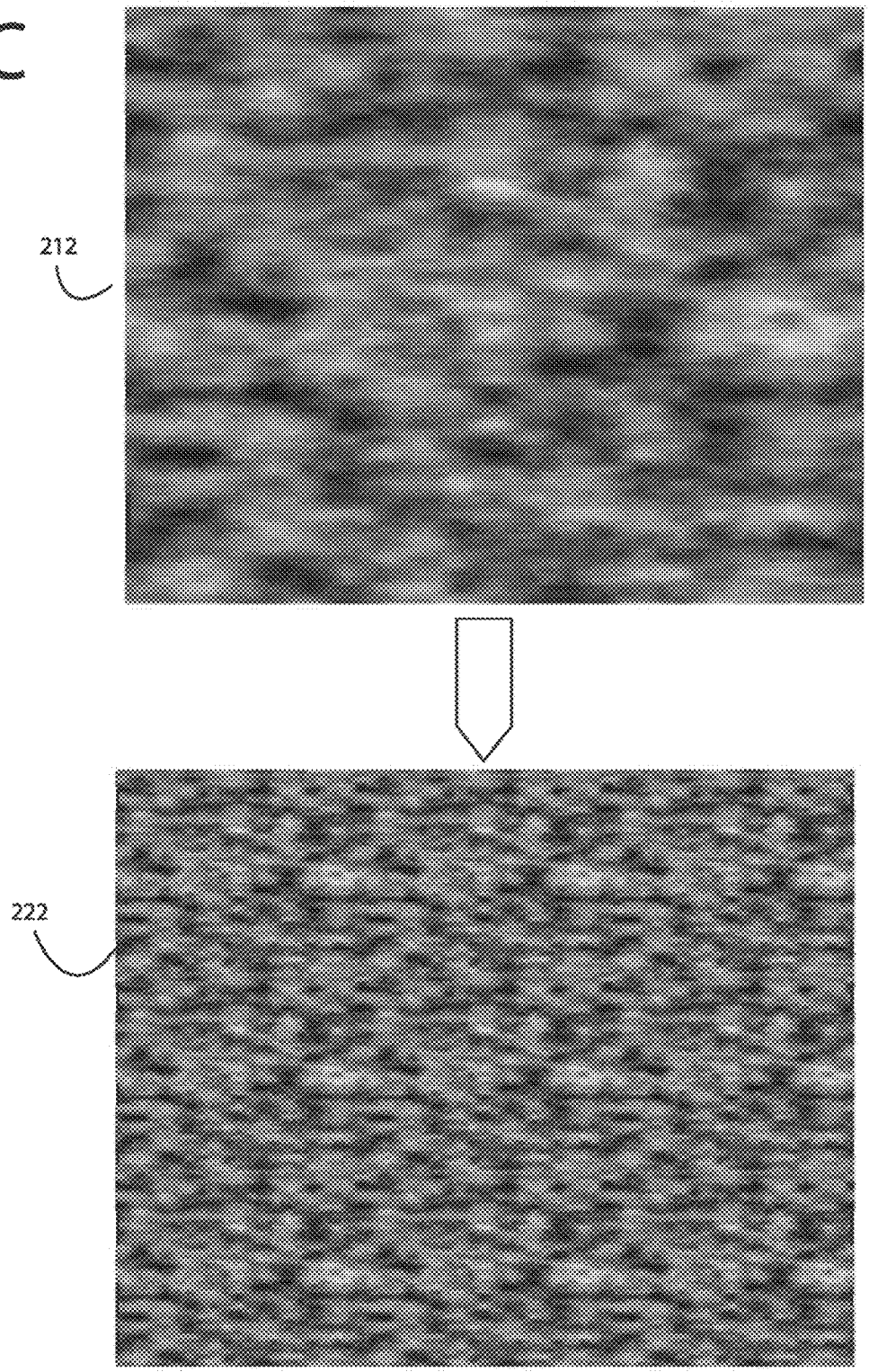
Figure 2D:
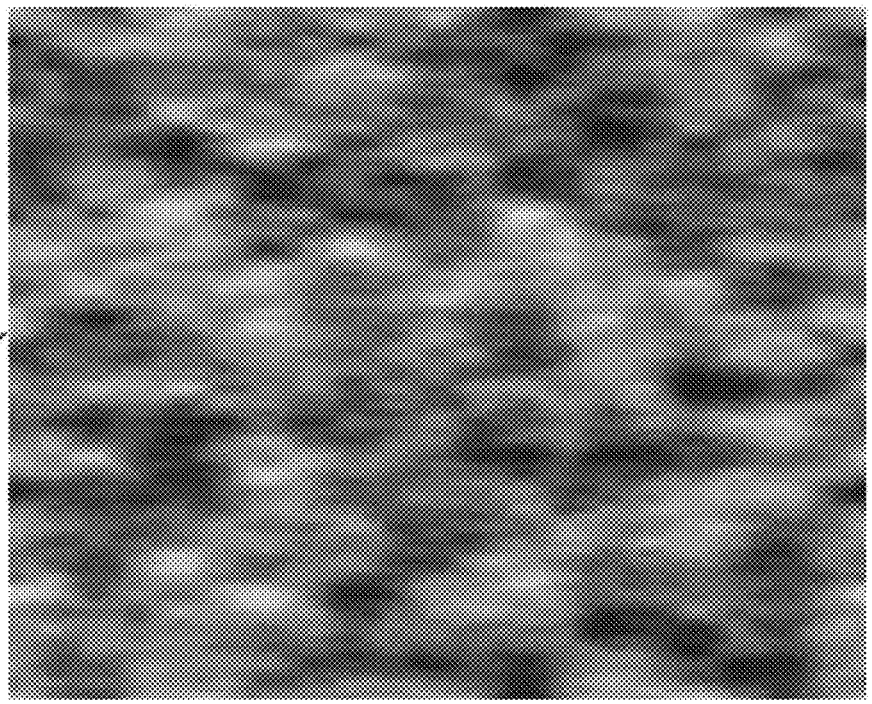
Figure 2D:
Figure 2D:
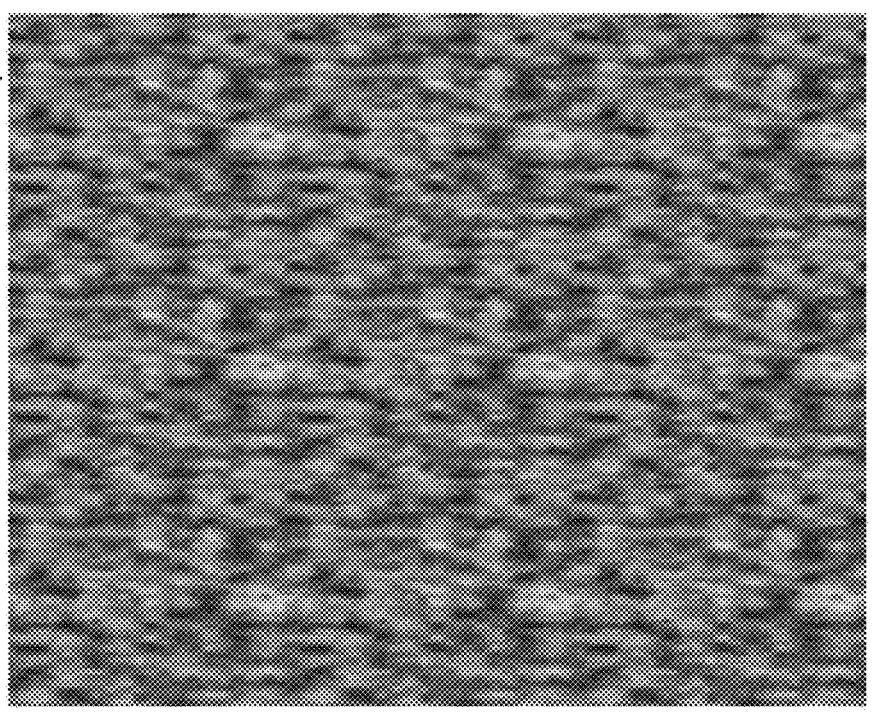
Figure 2E:
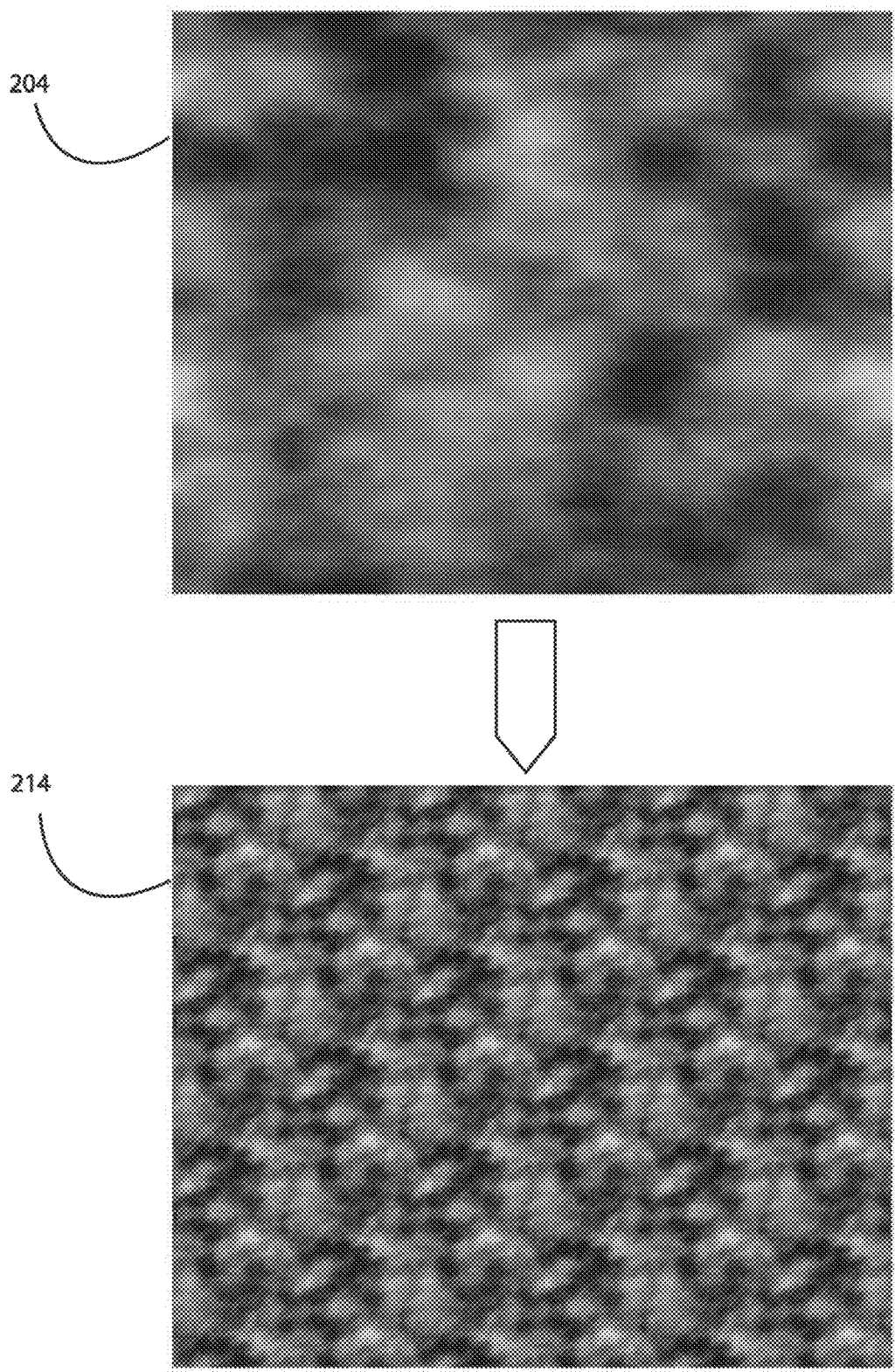
Figure 2F:
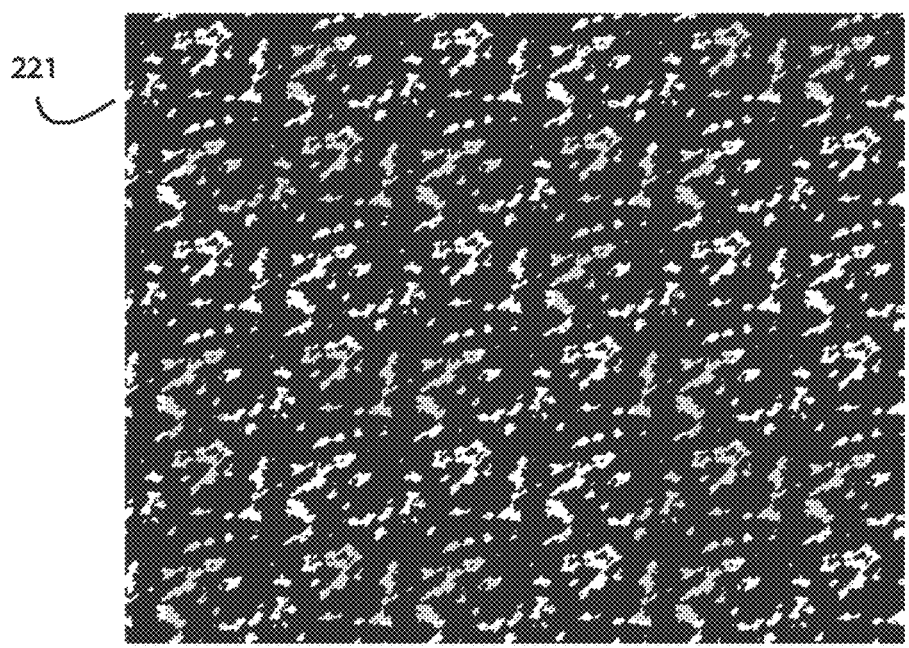
Figure 2F:
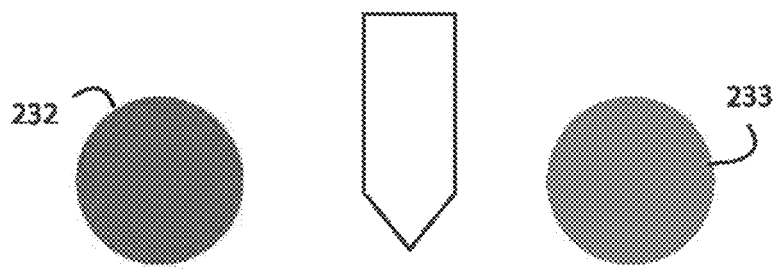
Figure 2F:
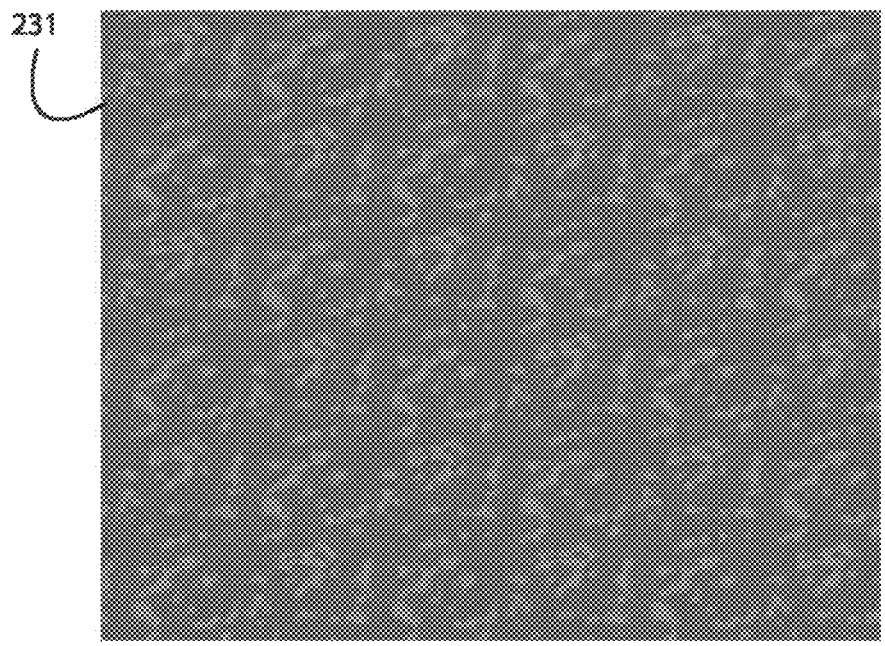
Figure 2G:
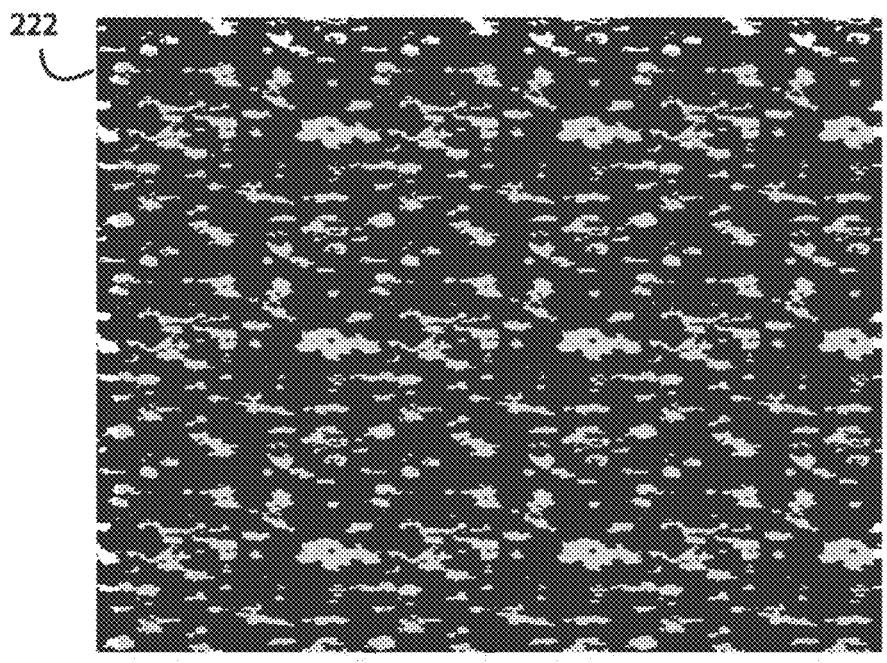
Figure 2G:
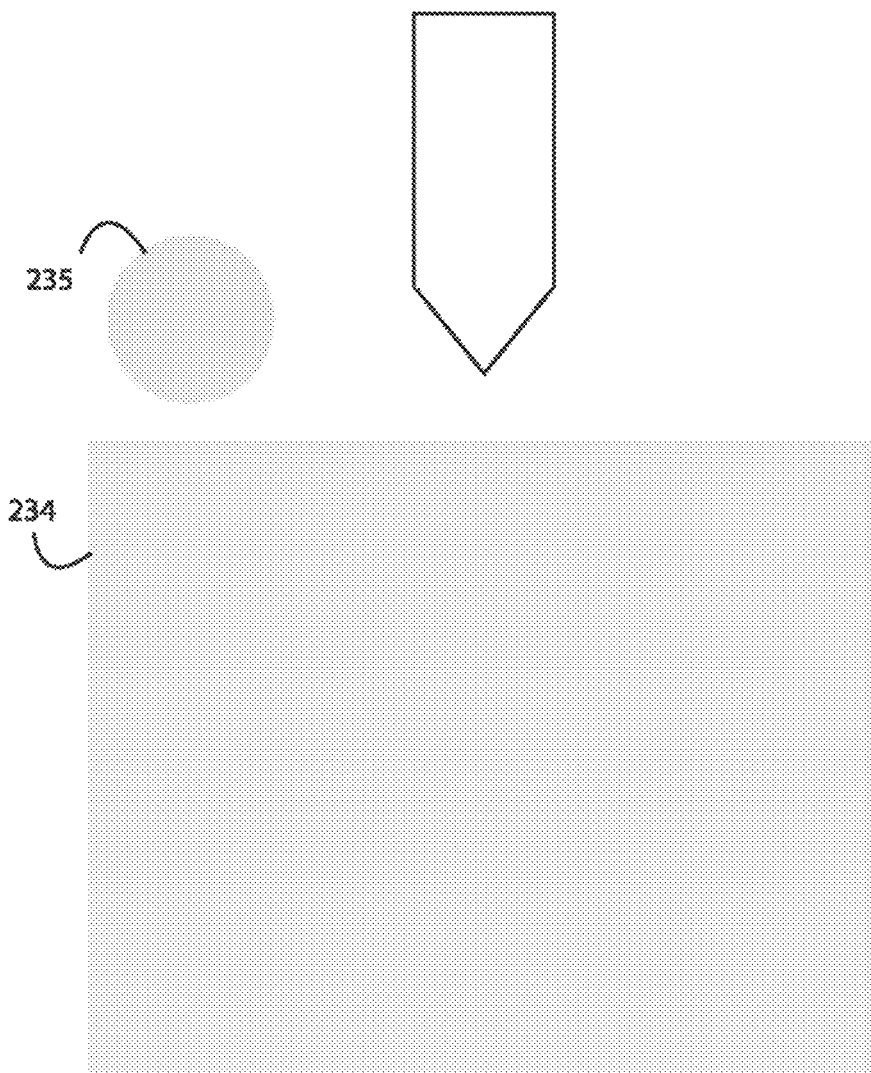
Figure 2J:
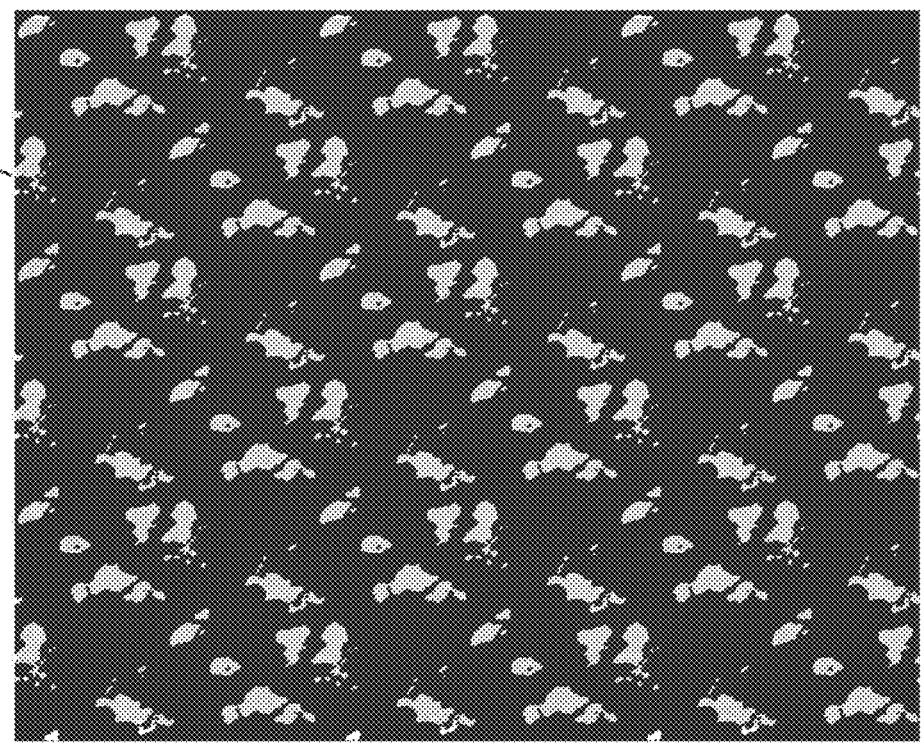
Figure 2J:
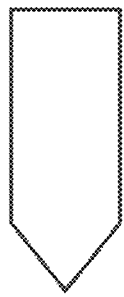
Figure 2J:
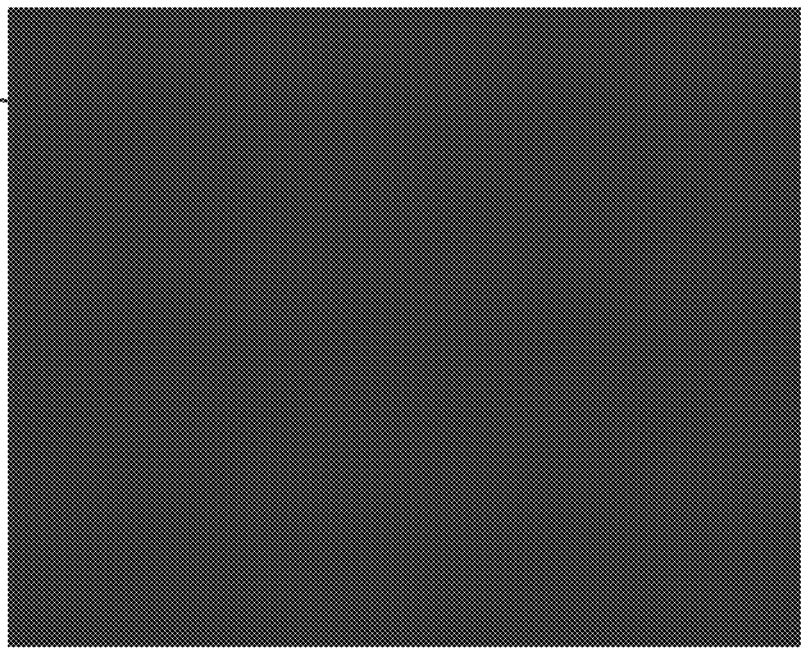
Figure 2K:
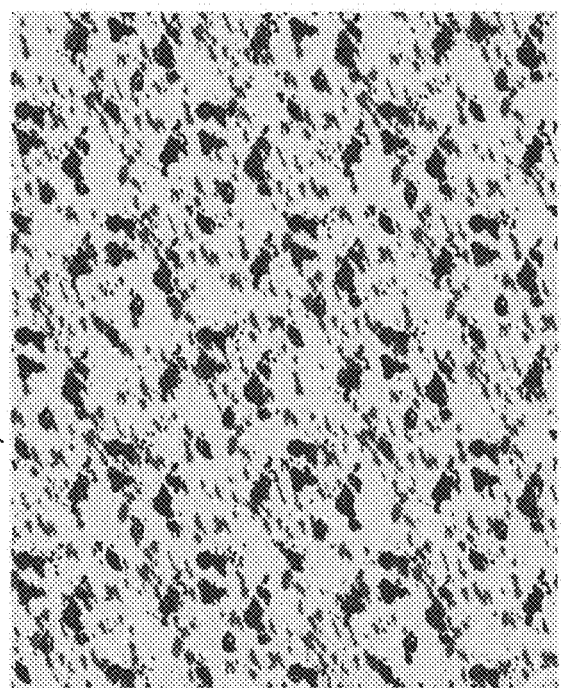
Figure 2K:
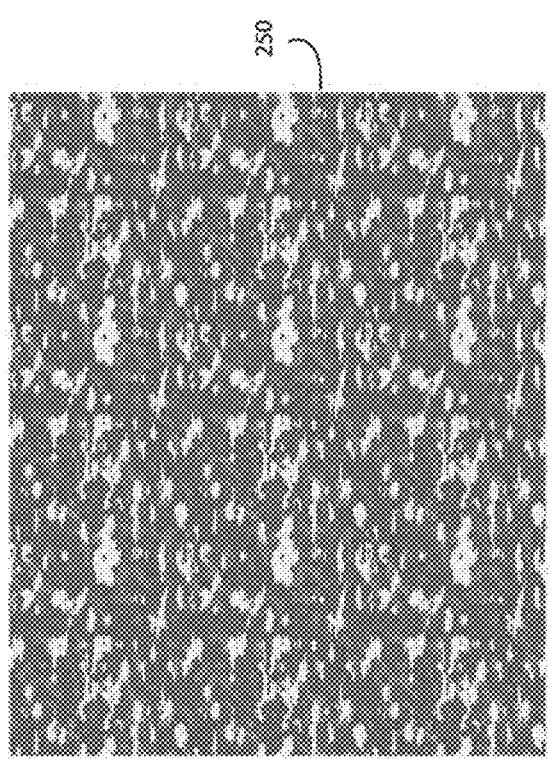
Figure 2K:
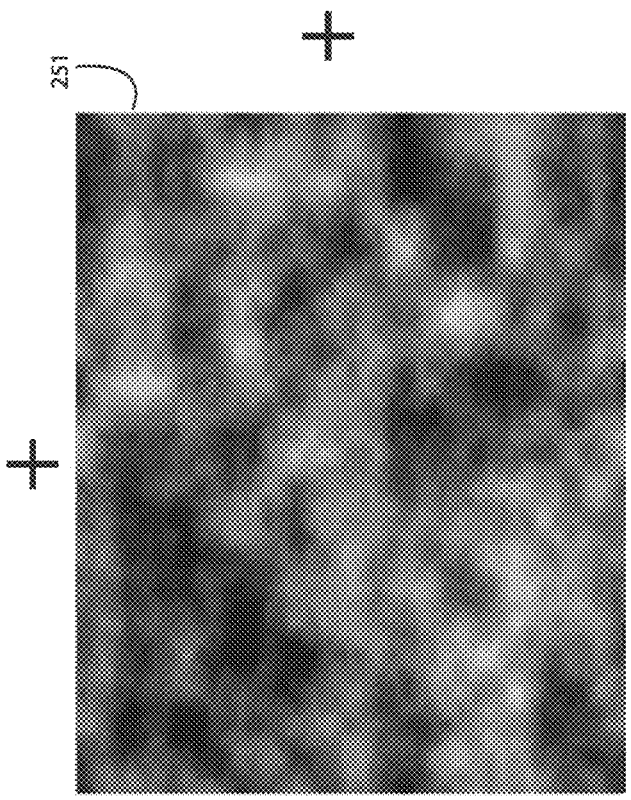
Figure 2L:
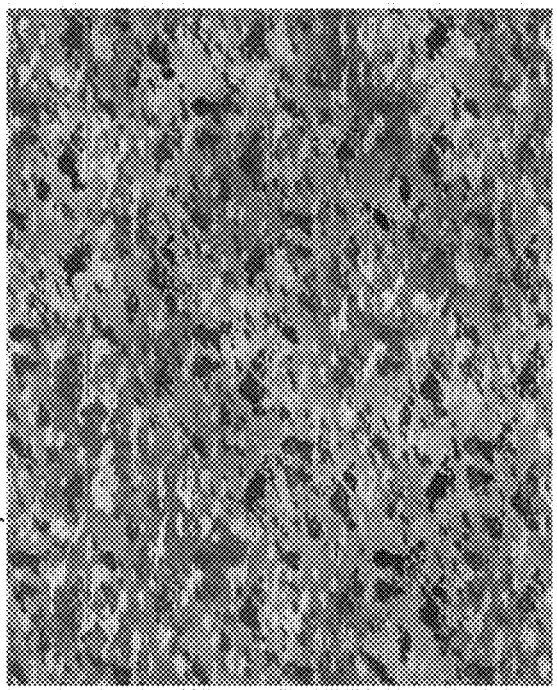
Figure 2L:
Figure 2L:
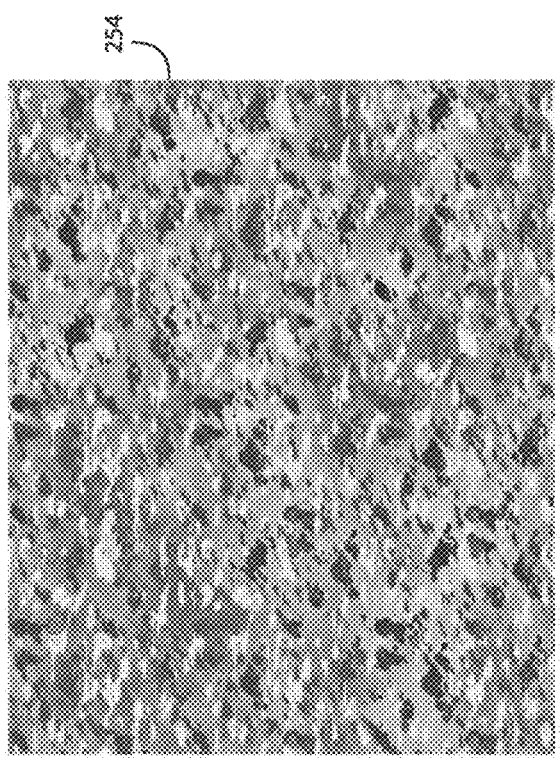
Figure 2L:
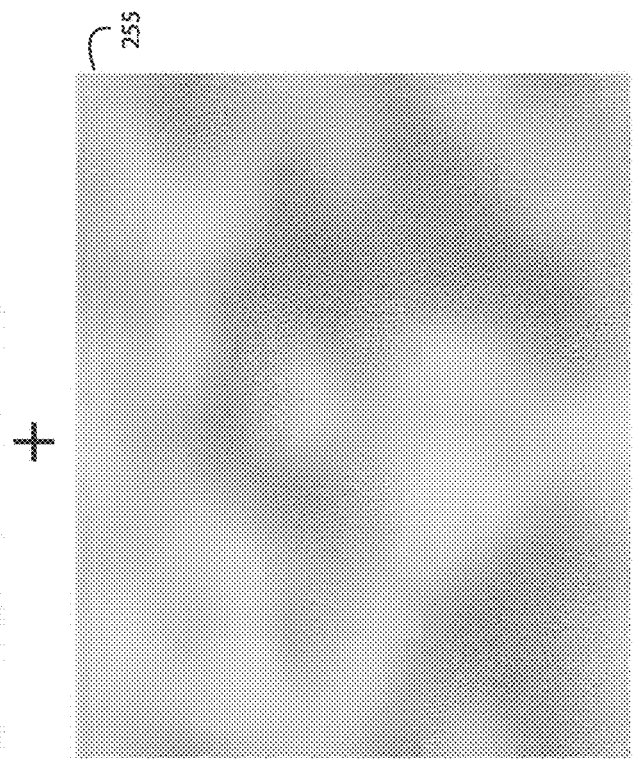
Figure 2M:
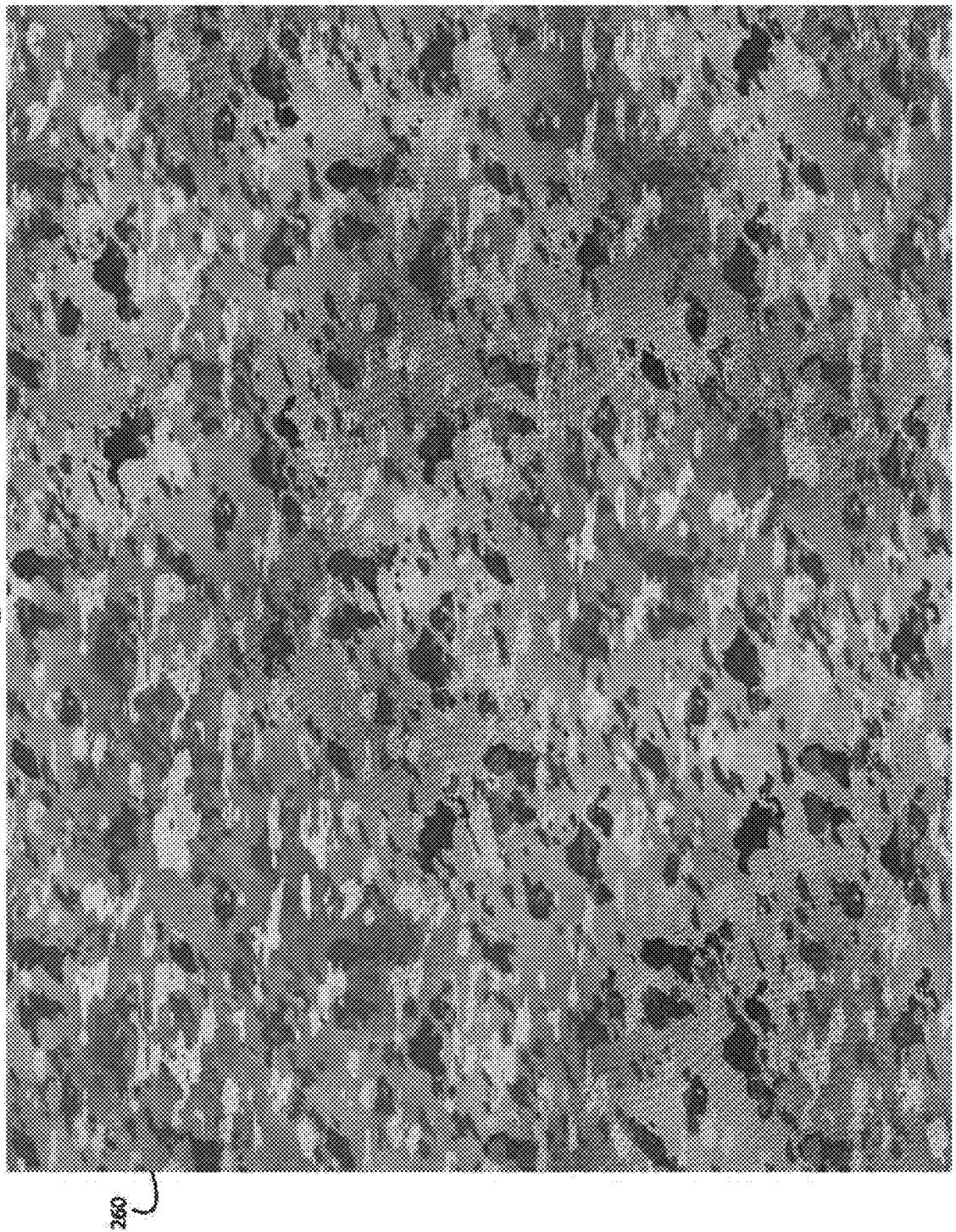
Figure 2N:
FIG. 2A is a flowchart diagram of a graphics design method embodiment of the present invention for rendering a pseudo-random concealment pattern that is printed, painted, or otherwise permanently deposited as color pigments on a substrate.
Figure 2P:
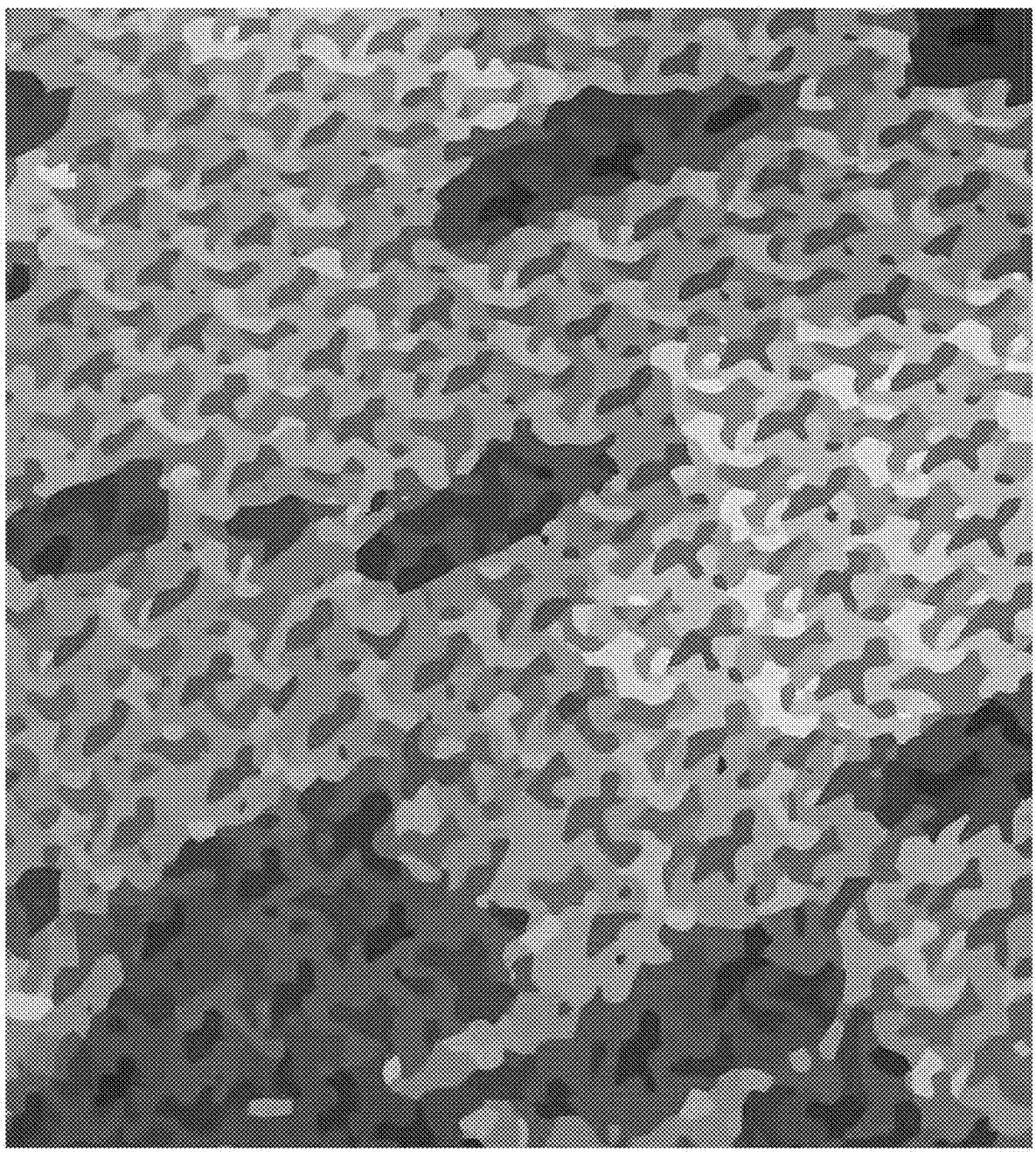
Figure 3:
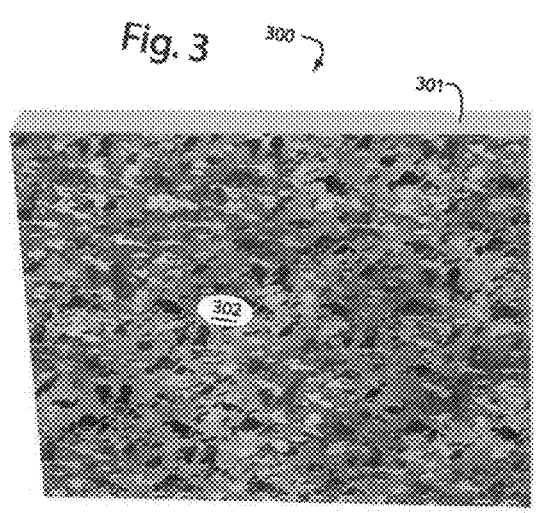
Figure 4:
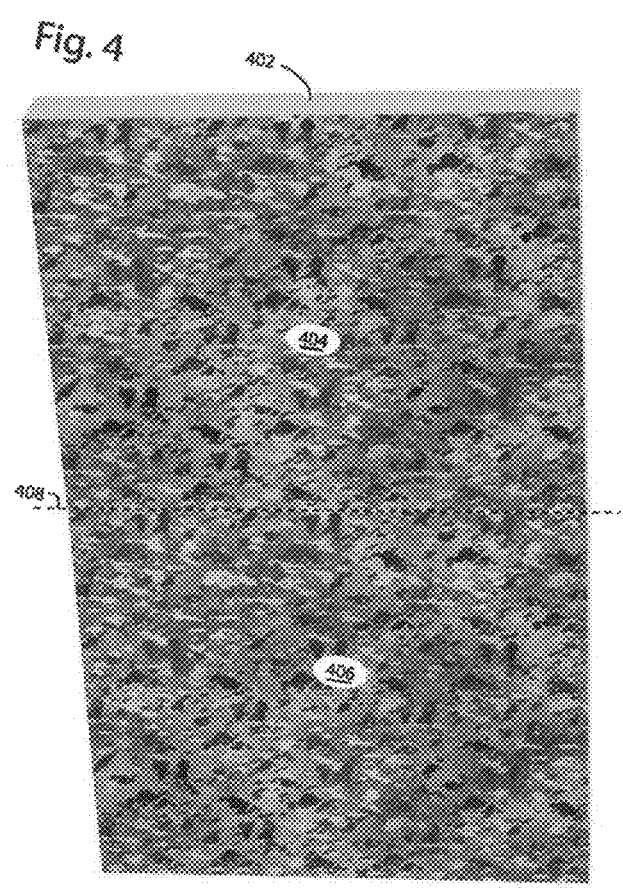
Figure 5:
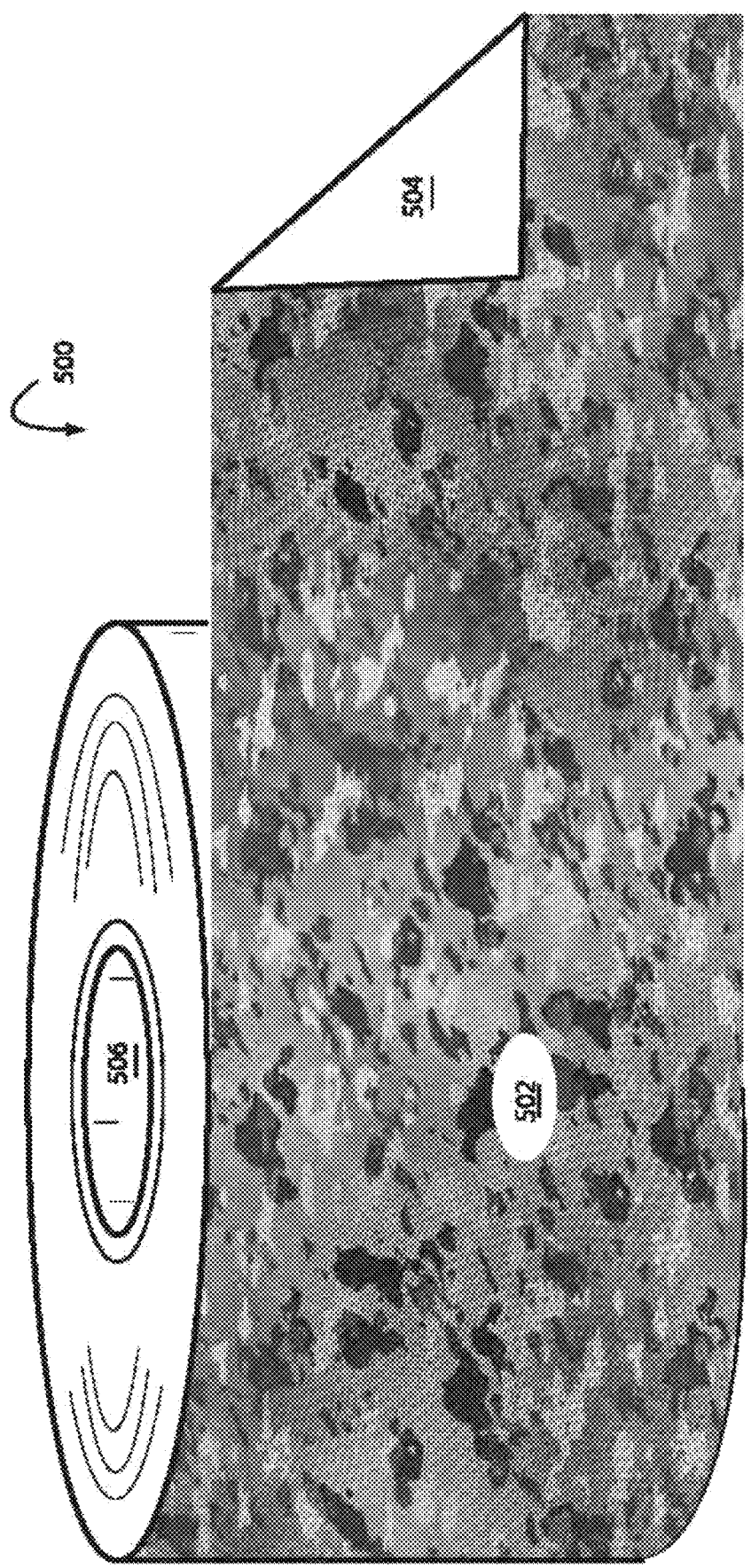
Figure 6:
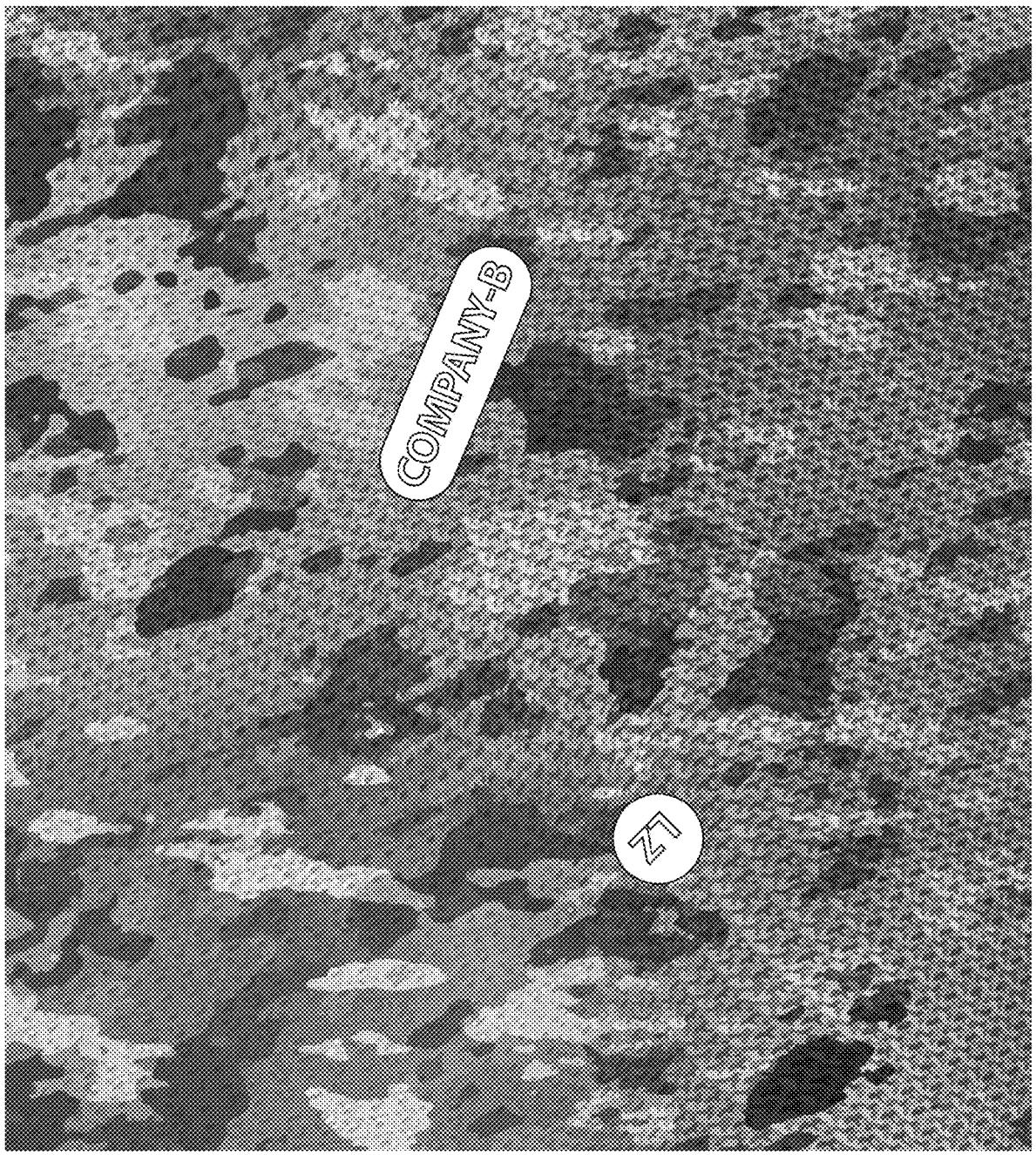
Figure 7:
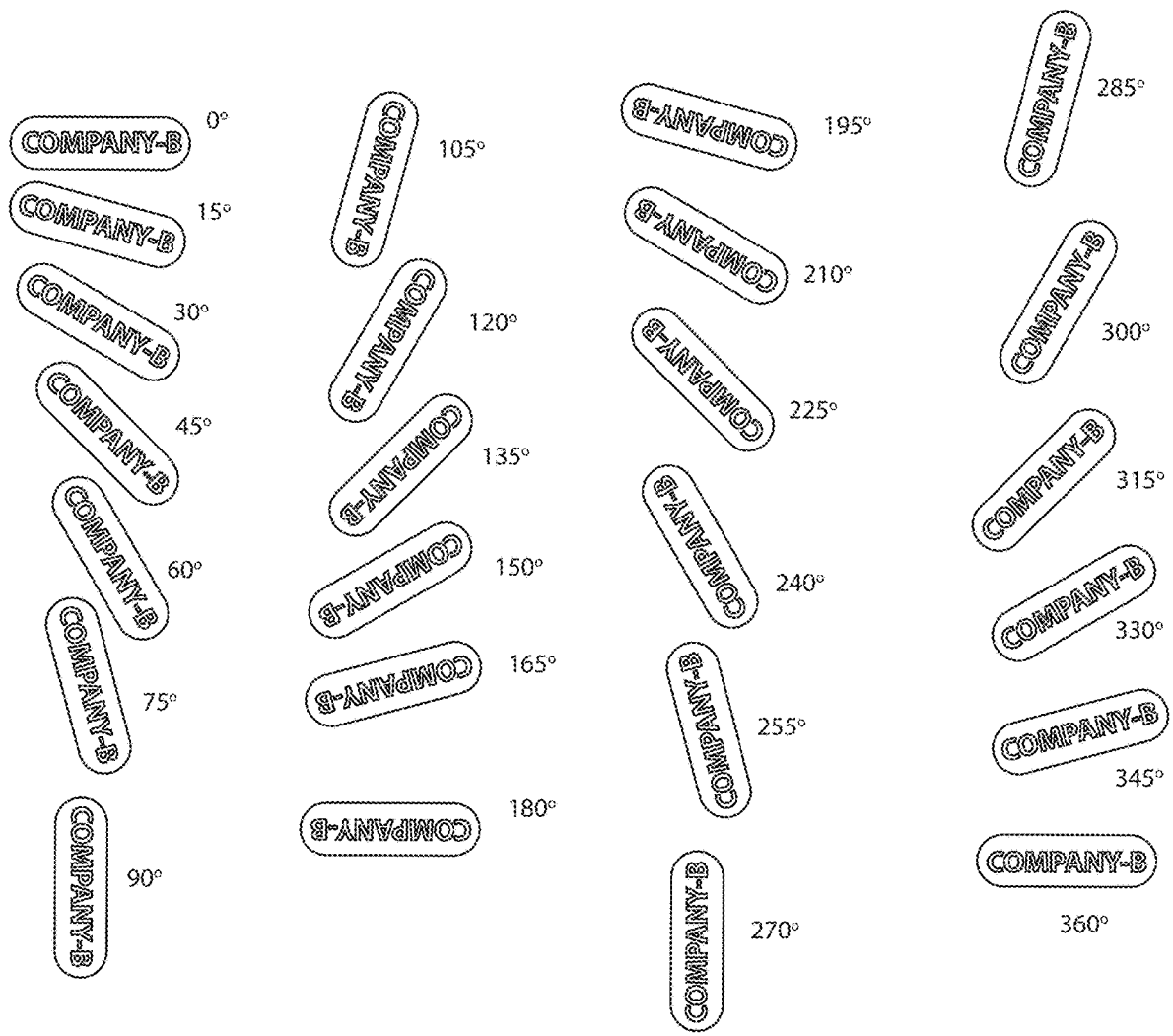

FIGS. 2N and 2P are four-times and twenty-six times magnifications of small portions of the distorted-grid mesh-texture concealment four-color camouflage pattern in FIG. 2M. These are presented herein to show how the regular placement of consistently sized, but darker-than-average, blobs and splotches of color, in conjunction with the mesh-textured overlay, give the appearance of natural blending at stand-off distances;

FIG. 3 is a perspective view diagram of a substrate printed on one side with a whole single tile of the repeatable concealment pattern produced by the Method of FIG. 2A, e.g., the pattern of FIG. 2M;

FIG. 4 is a perspective view diagram of a flexible blanket-sized Mylar substrate printed on one side with two whole single tiles of the repeatable concealment pattern seamlessly joined together along the dashed line;

FIG. 5 is a perspective view diagram of a roll of adhesive backed duct tape printed on one side with partial tiles of the repeatable concealment pattern seamlessly joined heel-to-toe along its longitudinal run;

FIG. 6 is a cartoon diagram representing what a user would see on an LCD monitor screen when camera is imaging a video raster of a natural jungle terrain from a kilometer away; and FIG. 7 is a diagram representing twenty-four 15° relative visual orientations, 0°-360°, that a message such as COMPANY-B could appear as in the field-of-view of a level camera. If a COMPANY-B message is present, and the PRN used is correct, one of the decoding shift registers of FIG. 1 will produce a message output, "COMPANY-B".

DETAILED DESCRIPTION OF THE PREFERRED EMBODIMENT

Figure 1:
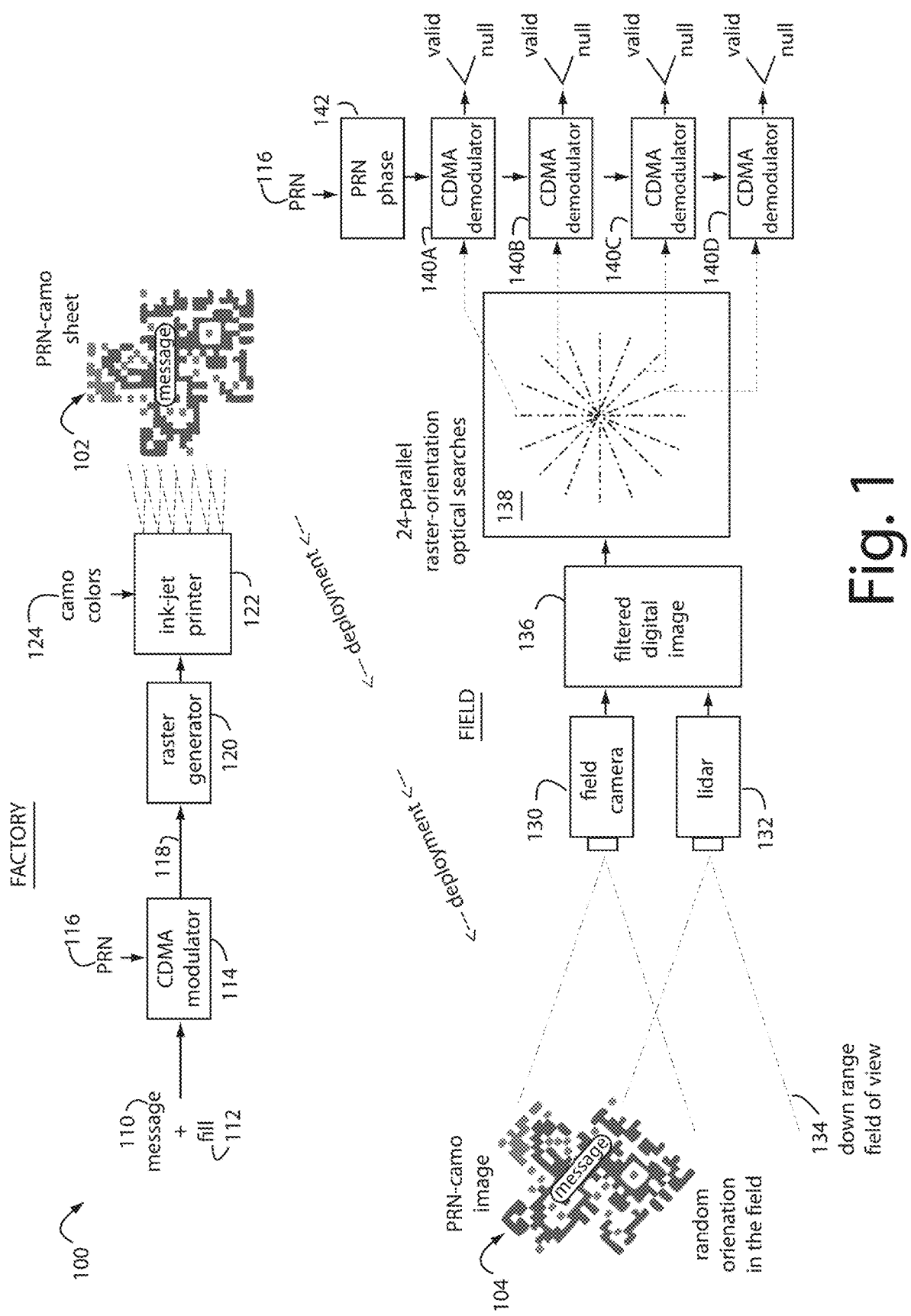

FIG. 1 represents a pseudo-random camouflage system 100 in an embodiment of the present invention. The pseudo-random camouflage system 100 can factory produce a sheet of pseudo-random camouflage 102 comprising a visible surface of a pseudo-randomly generated and positioned mixed-collection of blobs, splotches, drops, spots, globules, and blotches.

A second field-deployed part can then optically resolve and read the messages encrypted in a pseudo-random camouflage captured image 104. These images can be obtained in any orientation and at practical distances. The sheet of pseudo-random camouflage 102 can be produced in an ink-jet printer, silkscreen process, or other method that can faithfully produce a computed pseudo-random camouflage pattern on any tangible object. One extreme would be light projection on a reflective surface.

More generally, the pseudo-random camouflage need not be limited to sheets of material, but could be applied to any tangible substrate like military armor, vehicles, etc.

Herein, blobs, splotches, drops, spots, globules, and blotches are words in ordinary usage meant herein to describe the variety of ways inks, paints, and other contrasts applied to tangible materials will appear to observers and have no predefined or predictable borders, perimeters, shapes, or shadings.

As an example of what is meant by a "mixed-collection of blobs, splotches, drops, spots, globules, and blotches", see *How To Create a Repeating Camo Pattern in Illustrator*, by Chris Spooner, https://blog.spoongraphics.co.uk/, 29 Nov. 2010.

A message 110 (e.g., COMPANY-B) and surrounding pattern fill 112 are applied to a code division multiplex access (CDMA) modulator 114 that uses a PRN code 116 to produce what appears to be digital noise 118. A raster generator 120 places the message 110 and pattern fill 112 into a two-dimensional (2D) image raster representing the size of the tangible object to be printed or otherwise painted like sheet 102. Multiple image rasters can be tiled onto the tangible object to make the application more practical. An ink-jet printer 122 is an example of a device that can permanently apply the image raster to a sheet substrate. A palette of camo-colors 124 are selected to produce the best concealment given a selected use environment, e.g., jungle, desert, sky, sea, etc.

Sheets of pseudo-random camouflage 102 are stockpiled, warehoused, transported, distributed and otherwise deployed to the field for use.

Once in the field, individual sheets of pseudo-random camouflage 102 are used to cover, blanket, or other conceal people, equipment, and installations from view of detection by adversaries and otherwise unauthorized spotters. But, command and other authorized actors will be enabled to "see" exactly where in the field the people, equipment, and installations hidden from view are exactly positioned. That is, if PRN 116 is known to them. Otherwise, the individual sheets of pseudo-random camouflage 102 will operate as conventional camouflage.

A printable and displayable message 110 is chosen according to how and where the particular pseudo-random steganographic camouflage on the substrate is intended to be deployed. The printable and displayable message 110 is typically able to identify people, equipment, assets, hazards, and installations concealable by the pseudo-random steganographic camouflage printed on the substrate. It can also be used to hide or secret a trademark, copyright notice, security or counterfeiting countermeasure, etc.

A fill pattern 112 is needed to visibly submerge the message 110 when it's printed or displayed. The particular camouflage theme for the fill pattern includes conventional desert, jungle, woodland, sky, and sea palettes of colors and patterns.

A pseudo-random number (PRN) set 116 is needed for encoding a code in a code-division multiple access (CDMA) modulator 114. The modulator 114 controls a digital serialization 118 of the message 110 and the fill pattern 112 with the PRN 116 into component colors, saturations, and light levels adhering to a particular camouflage theme, e.g., camo colors 124. A two-dimensional raster generator 120 converts a serialization of the message and the fill pattern with the PRN code into a raster of horizontal scanning lines for color printing. A color printer, silkscreen, paint sprayer or other similar device (all represented by ink jet printer 122) applies paints, inks, and other colored materials to a substrate according to the serialization of the message and the fill pattern with the PRN into component colors, saturations, and light levels.

The challenge here is not unlike a global positioning system (GPS) navigation receiver which must first replicate the PRN code that is transmitted by the satellite vehicle (SV) being acquired by the receiver; then it must shift the phase of the replica code until it correlates with the SV PRN code. When cross-correlating the transmitted PRN code with a replica code, the same correlation properties occur that occurs for the mathematical autocorrelation process for a given PRN code. Receiver correlation processes are very different from autocorrelation processes because only selected points of the correlation envelope are found and examined by the receiver. When the phase of the GPS receiver replica code matches the phase of the incoming SV code, there is maximum correlation. When the phase of the replica code is offset by more than one "chip" (serial bit) on either side of the incoming SV code, there is minimum correlation. This is how GPS receivers detect the SV signals when acquiring or tracking the SV signals in the code phase dimension. GPS receivers must also detect the SV in the carrier phase dimension by replicating the carrier frequency to obtain carrier phase lock with the SV signal. So, GPS signal acquisition and tracking process is a two-dimensional, code and carrier, signal replication process. See, Ward, Betz, and Hegarty, *Satellite Signal Acquisition, Tracking, and Data Demodulation*. UNDERSTANDING GPS PRINCIPLES AND APPLICATIONS 2nd Ed., ISBN 1580538940, © 2006.

Here, "carrier phase" is not an uncertainty, but the relative visual orientation of a camera to the lay of image 104 deployed in the field is uncertain. The uncertainty as to range and zoom can be mitigated by measuring the range, e.g., with LIDAR.

The PRN code 116 will repeat many times in each raster. How the chips shift and wiggle represents the modulation data of the message 110.

The message 110 is visually submerged into pseudo-random steganographic camouflage 102 and is discernable from the fill 112 and readable as to the content to only cameras equipped with a CDMA demodulator and a correct PRN. Typical substrates include tangible sheet and bulk materials that can receive and retain inks, paints, and decorations on their surfaces from the printer. The raster generator 120 sends a serial stream of digital data to the printer 122 as a series of progressive scan lines that are recoverable by a digital camera employing raster scanning and a matching serial output.

The second, field deployable part of pseudo-random camouflage system 100 has a camera 130 that is positioned and focused such that it can capture PRN-camo image 104. A light detection and ranging (LIDAR) device 132 measures the distance and obtains a range. This is important to ascertain the degree of zoom necessary for camera 130 to produce a raster of a digital image that can be read for the message 110.

Alternatively, camera 130 could be mounted coaxially on an axle to rotate with a step motor in one degree increments, searching for the correct relative orientation. That is if time permits.

A filtered digital image 136 produced by an image processor represents PRN-camo image 104 in the relative orientation that camera 130 finds itself at the moment in the field. The PRN-camo image 104 could have the message 110 upside down or sideways, and thus frustrate simple PRN code searches and CDMA demodulation.

So in a splitter 138, twenty-four 15° twists of digital image 136 are distributed in parallel to twenty-four serial shift registers that can each independently match to PRN 116. Unauthorized field units will not have PRN 116. If, it turns out empirically, that 15° twists of digital image 136 are too large to reliably decode message 116, then finer twists and more PRN serial shift decoders will be necessary. This example is merely intended to describe the basic technique.

CDMA demodulators 140A-140D are intended to represent however many serial shift registers are necessary. Each is fed with a trial phasing of PRN 116 by a phase generator 142. If the PRN phase gets lucky, and if message 110 is present in PRN-camo image 104, one of the CDMA demodulators 140A-140D will spit out a valid character string. The others will produce noise.

The valid character string is easy enough to present in a user display in a visual display position and orientation derived from its processing.

Serialized and rasterized digital image streams here are not unlike what a GPS receiver would sense from a GPS satellite that transmits CDMA messages encoded with the satellite almanac and system time. CDMA demodulation based on a fixed known set of PRNs is conventional and highly developed in the navigation satellite receiver art. For example, see *Satellite Signal Acquisition, Tracking, and Data Demodulation*, by Phillip W. Ward NAVWARD GPS Consulting, and John W. Betz and Christopher J. Hegarty, The MITRE Corporation, pp. 153-241, UNDERSTANDING GPS PRINCIPLES AND APPLICATIONS 2nd Ed., ISBN 1580538940, © 2006, https://pdfs.semanticscholar.org/9897/aecb6eb1d23430480cb915df76 9cd93dfd9a.pdf FIGS. 2A-2M represent a graphics design method 200 in an embodiment of the present invention for rendering, e.g., a concealment pattern that is printed or painted on substrates like Mylar blankets and adhesive waterproof tapes in rolls. A first set of patterns 201-204 are generated from a mix of pseudo-random monochrome noise using a graphics design software like Adobe Illustrator. The pseudo-random part is a code division multiplex access (CDMA) modulation of a "Message". E.g., COMPANY-B.

These are individually rotated and tiled to produce a next set of patterns 211-214. Individual two-tone image contrast levels 221-224 are used to fix color transitions in each of the four pattern sets. A drab green color 231 is shifted by contrast level 221 between a darker-than-average drab green color 232 and a lighter-than-average drab green color 233. A grey color 234 is filtered by contrast level 222 to turn on or off grey color 235. A tan color 237 is shifted by contrast level 223 between a darker-than-average tan color 238 and a lighter-than-average tan color 239. A brown color 240 is filtered by contrast level 224 to turn on or off brown color 241.

Patterns 201 and 211 can be seen in much finer detail in FIG. 2B. Patterns 202 and 212 can be seen in much finer detail in FIG. 2C. Patterns 203 and 213 can be seen in much finer detail in FIG. 2D. Patterns 204 and 214 can be seen in much finer detail in FIG. 2E. Resulting pattern 231 that shifts between drab green colors 232 and 233 according to pattern 221 is presented in much finer detail in FIG. 2F. Color 234 that is filtered by pattern 222 is presented in much finer detail in FIG. 2G. Resulting pattern 237 that shifts between tan colors 238 and 239 according to pattern 223 is presented in much finer detail in FIG. 2H. Color 240 that is filtered by pattern 224 is presented in much finer detail in FIG. 2J.

A first color pattern group 250 results from adding together 221, 231, 222, and 234. A monochrome mixing map 251 is added with a second color pattern group 252 that is the sum of 223, 237, 224, and 240. See FIG. 2K. The three added together form a final four-color camouflage pattern 253. See FIG. 2L. Such can be the final step in this process, and printed on a substrate.

A distorted-grid mesh-texture pattern 254 is added to four-color camouflage pattern 253 to further distort the repeatable patterns, as well as provide an appearance of mesh-textured for printing on some Mylar blankets, duct tape, and other products. See FIG. 2L for finer details of the patterns. Such mesh-textured is an option. A distorted-grid mesh-texture concealment four-color camouflage pattern 260 is the final product of these steps and can be seen in finer detail in FIG. 2M.

In one embodiment of the invention, the graphic design is repeated in 230-cm×205-cm rectangular virtual tiles that visually blend seamlessly with identical neighbor tiles top-bottom and left-right sides. The graphic design includes two main elements throughout, a mesh-texture using fine grid shadowing and a color of woodland color splotches and blobs that mimic natural, unoccupied woodland settings and scenery.

A further refinement visually adds a distorted-grid mesh-texture to the concealment camouflage, and even faint "watermarks" of commercial trademarks plain to see or encrypted signatures and messages hidden in plain sight.

As a consequence of method 200, and for one forest concealment embodiment only, all the colors used cluster around shades of gray, green, brown, and drab green, olive drab, and army green, no two blobs seem to have exactly the same Cyan-Magenta-Yellow-Black (CMYK) color values. And so it could be said thousands of color shades are being used. And, because of the random noise generated rasters, no two blobs seem to have the same exact shapes, as all appear unique.

There are, however, general consistencies in blob sizes, about a dozen blob size groups. The mesh-texturing occurs parallel wave lines and each virtual intersecting thread occurs at regular period longitudinal and lateral positions represented by consistently sized blobs that are a few shades darker-than-average than the larger blobs that they overlay.

FIGS. 2N and 2P are four-times and twenty-six times magnifications of small portions of the distorted-grid mesh-textured concealment four-color camouflage pattern 260 in FIG. 2M. These show how the regular placement of consistently sized, but darker-than-average, blobs and splotches of color give the appearance of mesh-textured at stand-off distances.

Method 200 is one way of making a concealment substrate embodiment of the present invention. A first step generates a monochrome raster (201-204) of random noise for each of four colors (232, 235, 238, and 241) in a camouflage color palette. A next step rotates and equally tiles each of the four random-noise monochrome rasters as four individual tiles (211-214). A further step adds to each of the four random-noise monochrome rasters (211-214) a corresponding two-tone contrast level (221-224) to the four individual tiles. A next step adds to each of the four random-noise monochrome rasters a corresponding green, grey, tan, and brown color according to its respective two-tone contrast level. A next step mixes together a pair of color pattern groups (250, 252) of the above according to a monochrome mixing map (251) to obtain a unique camouflage pattern (253). A further step prints a substrate (201, 302) with whole and partial tiles (304, 306) of the unique camouflage pattern repeated as necessary to join seamlessly along each edge (308) with a neighboring tile.

In one embodiment, an optional step adds to the unique camouflage pattern (253) a visual mesh-textured raster (254), followed by printing of the combination (260). Other embodiments comprise graphics depicting the visual mesh-texture.

A first plurality of overlapping and unsystematically positioned blobs, splotches, drops, spots, globules, and blotches are such that each constituent comprises a unique proportioned combination within any one rectangular shaped tile area of, e.g., cyan-magenta-yellow-black (CMYK) color pigments in a limited range of cyan, a limited range of magenta, a limited range of yellow, and a limited range of black. Others can use RGB or Pantone instead of CMYK. These overlapping and unsystematically positioned blobs, splotches, drops, spots, globules, and blotches are such that each constituent comprises a unique shape within any one rectangular shaped tile area, and each constituent has an area size in the range of 2% to 20% of the area size of any one whole rectangular shaped tile area.

FIG. 3 represents a woodlands concealment product 300 with a base substrate 301 printed on one side with a whole single tile of the repeatable concealment pattern 202 produced by the Method of FIG. 2A, e.g., the pattern of FIG. 2M. Commercial materials that can be used for the base substrate 301 include paper, vinyl, tarps, spread cloths, foils, and stickers.

The foregoing example is not intended to be limiting nor exclude desert, artic, and other color pallets.

FIG. 4 represents a woodlands concealment emergency blanket 400 of a flexible blanket-sized Mylar substrate 302 printed on one side with two whole single tiles 404 and 406 of the repeatable concealment pattern 260 (FIG. 2M) seamlessly joined together along the dashed line 408. Of course however many whole or partial tiles can be seamlessly assembled as tiles to suit whatever product size is commercially necessary. A typical tile will be 230-cm by 205-cm. A typical heat-reflective emergency survival blanket will be 52" by 84" (232-cm by 214-cm). A similar flexible blanket-sized Mylar substrate 302 was developed by NASA in 1964 for the US space program. That material was a thin sheet of polyethylene terephthalate (PET) plastic, and deposition coated with a metallized reflector, usually gold or silver in color, and that reflects up to 97% of radiated heat.

For use in space, polyimide substrate, e.g., KAPTON, UPILEX®, is preferred due to its resistance to the hostile space environment, large temperature range (cryogenic to −260° C. and for short excursions up to over 480° C.), low outgassing (making it suitable for vacuum use) and resistance to ultraviolet radiation. Aluminized kapton, with foil thickness of 50 and 225 μm, was used on the Apollo Lunar Module. The polyimide gives the foils their distinctive amber-gold color. Space blankets are made by vaporizing pure aluminum and vacuum depositing micron thick films onto very thin, durable plastic substrates.

FIG. 5 is a perspective view diagram of a roll of waterproof-adhesive backed duct tape 500 printed on an outer side 502 with partial tiles of the repeatable concealment pattern 260 (FIG. 2M). Such tiles are seamlessly joined heel-to-toe along its longitudinal run. The inner side 504 has a waterproof adhesive and the tape material itself is a fabric. For example, a polyethylene-coated textile fabric cut into linear strips and coiled onto rolls 506. The tape 500 can be used to join together blankets 300 without disrupting the camouflage benefits.

The "printing" of pattern 260 (FIG. 2M) onto a base substrate includes conventional ink stamping, ink rolling, ink jet, silk screening, digital printing, laser xerography printing, spray painting, and other color pigment transfer and dye technologies.

The unique camouflage pattern 260 (FIG. 2M) can have at multiple variants, e.g., what we will trademark as HUNTER'S SHROWD, and WOODLAND SHROWD, which is the same design but uses a greener color pallet for the woodland shroud variant. Such designs are mostly aesthetic, as its usefulness has not been proven in the field yet. Since this particular pattern has never been seen before, it is still aesthetically pleasing, and it creates a value in the eyes of buyers. One objective of the present invention is to create patterns that never have been seen before. These here can't be recreated because the baseline monochrome random noise element produces a different result each time it's executed in the method 200. An adversary's knowing what to look for when searching for a camouflaged individual befuddles easy discovery.

Duct tape 500 is similarly improved by unique camouflage pattern 260 (FIG. 2M). The many useful properties and functions of standard silver-colored duct tape are maintained, while not creating obvious unnatural reflective delineations on the material it is used on. In addition, duct tape 400 can be used to cover monotone color painted equipment such as weapons and battle helmets in situations where better concealment is preferred.

The top half of FIG. 1 represents a factory portion of a pseudo-random camouflage system 100 that can produce a pseudo-random camouflage on a substrate. Such pseudo-random camouflage appears on a visible surface as a pseudo-randomly generated and positioned mixed-collection of blobs, splotches, drops, spots, globules, and blotches.

The bottom half of FIG. 1 represents a field deployable portion of pseudo-random camouflage system 100 that can, at practical distances, optically resolve and read encrypted messages visually appearing on the surface of a substrate with pseudo-random camouflage in an image captured in any orientation.

FIG. 6 represents a cartoon 600 of what a user would see on an LCD monitor screen when camera 130 is imaging a video raster of a natural jungle terrain from a kilometer away. At least one of our concealment substrates 102 is captured inside this field-of-view and each occupies, for example, ten percent of the raster area. Camera 130 would see these portions patched with PRN-camo image 104, and not see what is being concealed. Before any authorized message decoding, the concealment of the camouflage is as effective, as any conventional camouflage for this environment would ordinarily be. The object is our "friendlies" can be revealed to us but not to them because we hold the key, PRN 116. We can then take steps to assist, and not harm the friendlies, and they can remain passive and quiet because we don't need them to tell us anything.

In essence, it's a form of Steganography. See, Hiding Images in Plain Sight: Deep Steganography, by Shumeet Baluja Google Research Google, Inc. shumeet@google.com. Steganography is the practice of concealing a secret message within another, ordinary, message. Commonly, steganography is used to unobtrusively hide a small message within the noisy regions of a larger image. We are putting a concealment substrate 102 with pseudo-random noise in a natural field-of-view that a camera 130 will image as only a small part 104. Shumeet Baluja created deep neural networks that were simultaneously trained to create hiding and revealing processes and were designed to specifically work as a team. The system was trained on images drawn randomly from an ImageNet database, and worked well on natural images from a wide variety of sources. Beyond demonstrating the successful application of deep learning to hiding images, he examines how the result was achieved and explores extensions. Popular steganographic methods encode the secret message within the least significant bits of a carrier image, his approach compresses and distributes the secret image's representation across all of the available bits.

But COMPANY-B has concealed themselves under a concealment substrate 102 that was generated with PRN 116. A message, "COMPANY-B" was modulated into the camouflage printing. Camera 130 is not naturally squared with the message in the field, in fact, the relative orientations are never known to begin with. So all orientations 0°-360° must be expected as possible and every one tried. Best if all tries are accomplished in parallel. But one at a time is practical and could be attempted by mechanically rotating camera 130. In FIG. 1 we chose to electronically resolve the orientations to 15° sets of twenty-four. CDMA demodulators 140A-140D represented all of these. More than twenty-four may be needed, at this point the correct number is unknown due to a lack of test data.

In FIG. 6 we assume a practical distance of about a kilometer, but better can be obtained with advanced optics fitted to camera 130. The degree of zoom or magnification employed in each instant will determine the clock rates needed in the decoding shift registers to yield message outputs.

FIG. 7 represents the twenty-four 15° orientations, 0°-360°, that COMPANY-B could appear as in the field-of-view of camera 130. If COMPANY-B is present, one of the decoding shift registers will produce a message output, "COMPANY-B". How it was oriented would be useful to mimic in the user display screen cartoon 600. A landing zone (LZ) might also have been concealed by and near COMPANY-B.

Although the present invention has been described in terms of the presently preferred embodiments, it is to be understood that the disclosure is not to be interpreted as limiting. Various alterations and modifications no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A manufacturing method that produces a pseudo-random steganographic camouflage on a substrate, the manufacturing method comprising:
  setting a printable and displayable message;
  setting a fill pattern to visibly surround the message when printed or displayed;

predetermining a pseudo-random number (PRN) set for encoding a code in a code-division multiple access (CDMA) modulator;

employing a CDMA modulator to CDMA-modulate a digital serialization of the message and the fill pattern with the PRN into component colors, saturations, and light levels that fit a particular camouflage theme;

converting a serialization of the message and the fill pattern with the PRN with a two-dimensional raster generator into a raster of horizontal scanning lines for color printing; and applying byway of a color printer an application of color pigments to a substrate according to the serialization of the message and the fill pattern with the PRN into component colors, saturations, and light levels;

wherein, a pseudo-random steganographic camouflage thereby produced on the substrate visually displays the message which is discernable to only cameras equipped with a CDMA demodulator and the PRN.

2. The manufacturing method of claim 1, wherein the printable and displayable message identifies people, equipment, assets, hazards, or installations to be concealed by the pseudo-random steganographic camouflage printed on the substrate.

3. The manufacturing method of claim 1, wherein the substrate includes a tangible sheet or bulk materials, wherein the tangible sheet and bulk materials have a surface capable of receiving and retaining inks, paints, and decorations from the printer.

4. The manufacturing method of claim 1, wherein the particular camouflage theme includes any of a desert, jungle, woodland, sky, and sea palettes of colors and patterns.

5. The manufacturing method claim 1, further comprising: sending a serial stream of digital data byway of the two-dimensional raster generator to the printer as a series of progressive scan lines that are recoverable by a digital camera employing raster scanning and a matching serial output.

6. A manufacturing system to produce a pseudo-random steganographic camouflage on a substrate, comprising:

a printable and displayable message;

a fill pattern to visibly surround the message when printed or displayed;

a pseudo-random number (PRN) set for encoding a code in a code-division multiple access (CDMA) modulator;

a CDMA modulator that CDMA modulates a digital serialization of the message and the fill pattern with the PRN into component colors, saturations, and light levels adhering to a particular camouflage theme;

a two-dimensional raster generator that converts a serialization of the message and the fill pattern with the PRN into a raster of horizontal scanning lines for color printing; and a color printer that applies paints, inks, and other materials to a substrate according to the serialization of the message and the fill pattern with the PRN into component colors, saturations, and light levels;

wherein, a pseudo-random steganographic camouflage produced on a substrate visually displays the message discernable to only cameras equipped with a CDMA demodulator and the PRN.

7. The manufacturing system of claim 6, wherein: the printable and displayable message identifies people, equipment, assets, hazards, or installations concealed by the pseudo-random steganographic camouflage printed on the substrate.

8. The manufacturing system of claim 6, wherein: the substrate includes tangible sheet and bulk materials that can receive and retain inks, paints, and decorations on their surfaces from the printer.

9. The manufacturing system of claim 6, wherein: the particular camouflage theme includes desert, jungle, woodland, sky, and sea palettes of colors and patterns.

10. The manufacturing system of claim 8, wherein: the two-dimensional raster generator is configured to send a serial stream of digital data to the printer as a series of progressive scan lines that, if visible to, are decipherable or otherwise recoverable by a digital camera employing raster scanning and a matching serial output.

* * * * *